(12) United States Patent
Uchida

(10) Patent No.: US 10,731,685 B2
(45) Date of Patent: Aug. 4, 2020

(54) FIXTURE

(71) Applicant: Kitagawa Industries Co., Ltd., Aichi (JP)

(72) Inventor: Tatsuya Uchida, Aichi (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 275 days.

(21) Appl. No.: 15/771,553

(22) PCT Filed: Oct. 27, 2016

(86) PCT No.: PCT/JP2016/081906
§ 371 (c)(1),
(2) Date: Apr. 27, 2018

(87) PCT Pub. No.: WO2017/073678
PCT Pub. Date: May 4, 2017

(65) Prior Publication Data
US 2018/0328394 A1 Nov. 15, 2018

(30) Foreign Application Priority Data
Oct. 29, 2015 (JP) .................. 2015-213050

(51) Int. Cl.
*F16B 5/06* (2006.01)
*F16F 15/08* (2006.01)
(Continued)

(52) U.S. Cl.
CPC ............ *F16B 5/0635* (2013.01); *F16B 5/065* (2013.01); *F16B 5/0628* (2013.01);
(Continued)

(58) Field of Classification Search
CPC .... F16B 5/0024; F16B 5/0628; F16B 5/0635; F16B 5/065; F16B 21/082; F16B 5/06; F16F 15/08
(Continued)

(56) References Cited

U.S. PATENT DOCUMENTS 3,777,052 A * 12/1973 Fegen .................. F16B 21/082
174/138 D
4,297,769 A * 11/1981 Coules ................. F16B 21/086
174/138 D
(Continued)

FOREIGN PATENT DOCUMENTS

DE   198 33 230 A1   2/1999
DE   102 49 275 A1   5/2004
(Continued)

OTHER PUBLICATIONS

Chinese Office Action Corresponding to 201680060700.7 dated Mar. 28, 2019.
(Continued)

*Primary Examiner* — Roberta S Delisle
(74) *Attorney, Agent, or Firm* — Davis & Bujold PLLC; Michael J. Bujold

(57) ABSTRACT

A fixture according to an aspect of the present disclosure includes a shaft portion, a first fixing portion, a spacer, and a second fixing portion. A connection portion passing through the inside of the spacer and being connected to both the shaft portion and the second fixing portion is provided inside the spacer. The shaft portion includes a first hard resin portion, a second hard resin portion, and a soft resin portion. A soft resin portion is interposed between the first hard resin portion and the second hard resin portion so that vibration transmitted from either the first hard resin portion or the second hard resin portion to the other can be dampened.

8 Claims, 9 Drawing Sheets

(51) Int. Cl.
*F16B 21/08* (2006.01)
*F16B 5/00* (2006.01)

(52) U.S. Cl.
CPC ............ *F16B 21/082* (2013.01); *F16F 15/08* (2013.01); *F16B 5/0024* (2013.01); *F16B 5/06* (2013.01)

(58) Field of Classification Search
USPC .......................................... 411/508, 509, 510
See application file for complete search history.

(56) References Cited

U.S. PATENT DOCUMENTS

| | | | | |
|---|---|---|---|---|
| 4,635,325 | A * | 1/1987 | Yagi | F16B 5/0607 |
| | | | | 174/138 D |
| 4,952,158 | A * | 8/1990 | Nakagawa | F16B 5/065 |
| | | | | 174/138 G |
| 5,191,513 | A * | 3/1993 | Sugiura | H05K 7/142 |
| | | | | 174/138 D |
| 5,647,713 | A * | 7/1997 | Ge | B29C 45/1676 |
| | | | | 24/324 |
| 5,685,682 | A | 11/1997 | Glime et al. | |
| 6,581,252 | B1 * | 6/2003 | Sedlock | F16B 5/065 |
| | | | | 24/297 |
| 7,073,231 | B2 * | 7/2006 | Draggoo | B60R 13/0206 |
| | | | | 24/297 |
| D734,130 | S * | 7/2015 | Ito | D8/354 |
| 9,714,673 | B2 * | 7/2017 | Phillips | F16B 12/24 |
| 2015/0298623 | A1 | 10/2015 | Kato et al. | |

FOREIGN PATENT DOCUMENTS

| | | |
|---|---|---|
| EP | 1 494 519 A2 | 1/2005 |
| JP | H0650385 A | 2/1994 |
| JP | H08247121 A | 9/1996 |
| JP | 2008-274978 A | 11/2008 |
| JP | 2008274978 A | 11/2008 |

OTHER PUBLICATIONS

Extended European Search Report Corresponding to 16859907.4 dated Jun. 6, 2019.
Translation of International Search Report for PCT/JP2016/081906 dated Jan. 10, 2017.

* cited by examiner

FIXTURE

CROSS-REFERENCE TO RELATED APPLICATION

This international application claims priority to Japanese Patent Application No. 2015-213050A filed to Japan Patent Office on Oct. 29, 2015, and the total contents of Japanese Patent Application No. 2015-213050A are hereby incorporated by reference.

TECHNICAL FIELD

The present disclosure relates to a fixture used to fix a first object to a second object.

BACKGROUND ART

There is known a vibration-absorbing fixture used to fix an article to another member (for example, see Patent Document 1). In the case of the vibration-absorbing fixture described in Patent Document 1, a first attachment unit is fixed to one end of a shaft portion. An elastic member is provided on the other end of the shaft portion. The other end of the shaft portion and a second attachment unit are connected via the elastic member.

Patent Document 1 also discloses an example in which the shaft portion, the first attachment unit, and the second attachment unit are made of a hard resin (for example PP (polypropylene)), an example in which the elastic member is made of a soft resin (for example, TPS (styrene-based thermoplastic elastomer)), and the like.

CITATION LIST

Patent Literature

Patent Document 1: Japanese Unexamined Patent Application Publication No. 2008-274978A

SUMMARY

Technical Problem

The elastic member as described above is made of the soft resin as described above. As a result, the mechanical strength is correspondingly lower than the mechanical strength of the shaft portion or the like made of a hard resin. Therefore, the vibration-absorbing fixture as described above may be broken easily at a portion of the elastic member when an unexpectedly large load is applied to the vibration-absorbing fixture, for example. The fixture may also be broken easily at a portion of the elastic member when the mechanical strength of the elastic member further decreases due to changes over time.

However, in the case of the vibration-absorbing fixture described in Patent Document 1, the elastic member serves the role of connecting the shaft portion and the second attachment unit at a position between a first object and a second object. Therefore, for example, when the elastic member breaks due to some sort of circumstance, disconnection between the shaft portion and the second attachment unit is caused. In this case, there has been a possibility that the first object may fall off the second object.

An aspect of the present disclosure desirably provides a fixture capable of preventing a first object from falling off a second object.

Solution to Problem

A fixture according to an aspect of the present disclosure is used to fix a first object to a second object. The fixture includes a shaft portion, a first fixing portion, a spacer, and a second fixing portion. The shaft portion is formed into a column shape. The first fixing portion is provided at one end of the shaft portion. The spacer is provided at the other end of the shaft portion. The second fixing portion is provided at a site on an opposite side as the shaft portion to sandwich the spacer. A connection portion is provided inside the spacer. The connection portion passes through the inside of the spacer and is connected to both the shaft portion and the second fixing portion. A shaft holding portion is provided on the first object, and is configured such that the shaft portion can be held by the shaft holding portion when the shaft portion is inserted into the shaft holding portion. The shaft portion is configured such that the shaft portion can be inserted into the shaft holding portion from the first fixing portion side. The first fixing portion is configured such that the first fixing portion can be fixed to the first object while the shaft portion is inserted in the shaft holding portion. The second fixing portion is configured such that the second fixing portion can be fixed to the second object. The spacer is configured such that when the first fixing portion is fixed to the first object and the second fixing portion is fixed to the second object, the spacer can be sandwiched between the first object and the second object to secure a space between the first object and the second object. The spacer is made of a soft resin having a property of dampening vibration. As a result, the spacer is configured to be able to dampen vibration transmitted from either the first object or the second object to the other. The shaft portion includes a first hard resin portion, a second hard resin portion, and a soft resin portion. The first hard resin portion is made of a hard resin and is provided integrally with the first fixing portion. The second hard resin portion is made of a hard resin and is provided integrally with the connection portion and the second fixing portion. The soft resin portion is interposed between the first hard resin portion and the second hard resin portion to connect the first hard resin portion and the second hard resin portion. The soft resin portion is made of a soft resin having a property of dampening vibration. As a result, the soft resin portion is configured to be able to dampen vibration transmitted from either the first hard resin portion or the second hard resin portion to the other.

The fixture configured as described above is used to fix the first object to the second object. The shaft holding portion as described above is provided on the first object, and when the fixture is used, the shaft portion is inserted into the shaft holding portion from the first fixing portion side. The first fixing portion is fixed to the first object while the shaft portion is inserted in the shaft holding portion. In addition, the second fixing portion is fixed to the second object.

The spacer is sandwiched between the first object and the second object, and a space is secured by the spacer between the first object and the second object. As a result, vibration can be prevented from being directly transmitted from either the first object or the second object to the other. In addition, the spacer is made of a soft resin having a property of dampening vibration. Therefore, vibration transmitted from either the first object or the second object to the other via the spacer can be dampened. Note that as the soft resin having a property of dampening vibration, any of a vibration-absorbing soft resin, a vibration-damping soft resin, and a vibration-absorbing and vibration-damping soft resin may be used depending on the intended use.

The shaft portion includes the first hard resin portion, the second hard resin portion, and the soft resin portion as described above. The first hard resin portion is provided integrally with the first fixing portion, and the second hard resin portion is provided integrally with the connection portion and the second fixing portion. Therefore, vibration can be transmitted to the first hard resin portion from the first object side via the first fixing portion. In addition, vibration can also be transmitted to the second hard resin portion from the second object side via the connection portion and the second fixing portion. However, the soft resin portion as described above is interposed between the first hard resin portion and the second hard resin portion to connect the first hard resin portion and the second hard resin portion. As a result, vibration transmitted from either the first hard resin portion or the second hard resin portion to the other can be dampened.

According to such a fixture, the second hard resin portion is provided integrally with the connection portion and the second fixing portion. Therefore, even in a case where the spacer breaks, disconnection between the second fixing portion and the second hard resin portion will not be caused. In addition, even in a case where the soft resin portion breaks, the second hard resin portion will be held by the shaft holding portion. Accordingly, the state in which the shaft portion is held by the shaft holding portion can be maintained, and the first object can be prevented from falling off the second object.

DESCRIPTION OF EMBODIMENTS

Figure 1A:
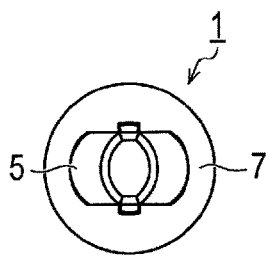
FIG. 1A is a plan view of a fixture of a first embodiment.
Figure 1B:
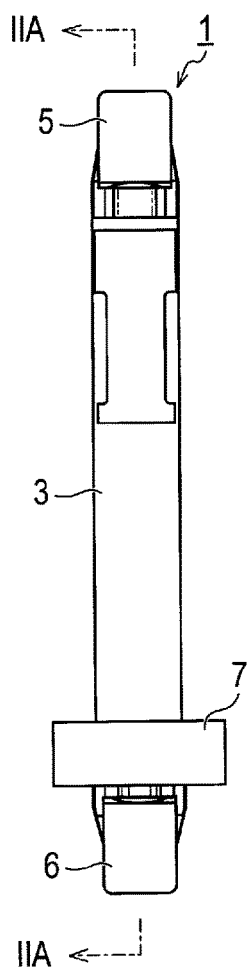
FIG. 1B is a left side view of the fixture of the first embodiment.
Figure 1C:
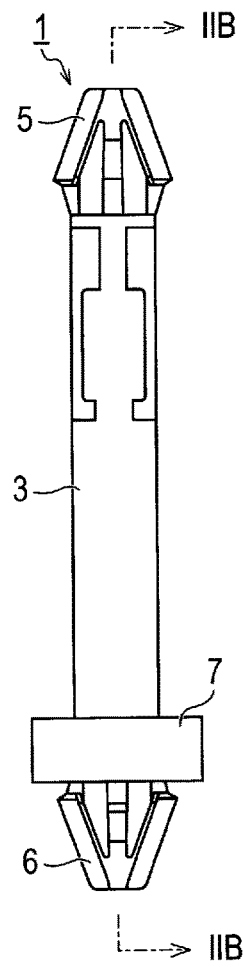
FIG. 1C is a front view of the fixture of the first embodiment.
Figure 1E:
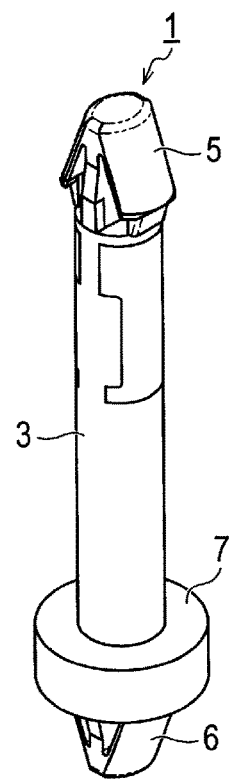
FIG. 1E is a perspective view of the fixture of the first embodiment.
Figure 1D:
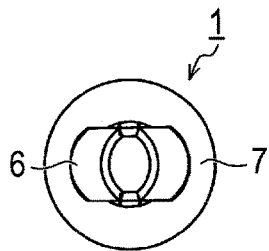
FIG. 1D is a bottom view of the fixture of the first embodiment.

Next, exemplary embodiments of the present disclosure will be described.

(1) First Embodiment

As illustrated in FIGS. 1A to 1E, a fixture 1 includes a shaft portion 3, a first fixing portion 5, a second fixing portion 6, and a spacer 7. In this embodiment, the shaft portion 3 is formed into a column shape, the first fixing portion 5 is provided at one end of the shaft portion 3, and the spacer 7 is provided at the other end of the shaft portion 3. The second fixing portion 6 is provided at a site on the opposite side as the shaft portion 3 so as to sandwich the spacer 7. Note that, as illustrated in FIGS. 2A and 2B, in a direction aligned with the axial direction of the shaft portion 3, the first fixing portion 5 is disposed in range A1, the shaft portion 3 is disposed in range A2, the spacer 7 is disposed in range A3, and the second fixing portion 6 is disposed in range A4.

Figure 2A:
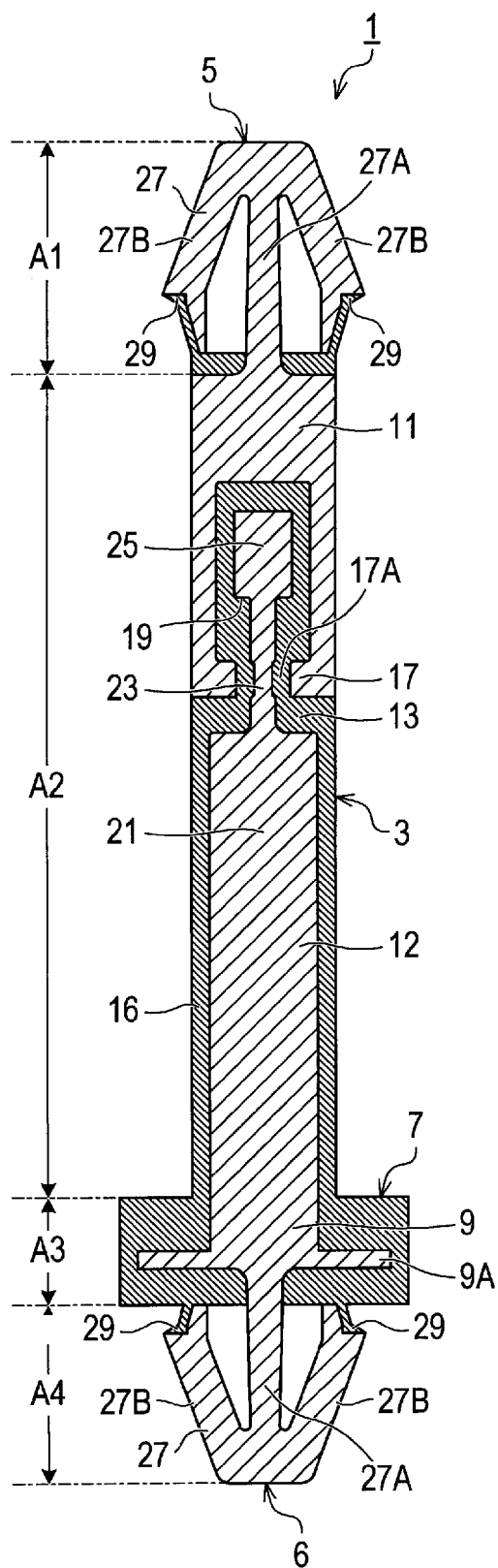
FIG. 2A is a cross-sectional view of a cutout site illustrated by line IIA-IIA in FIG. 1B.
Figure 2B:
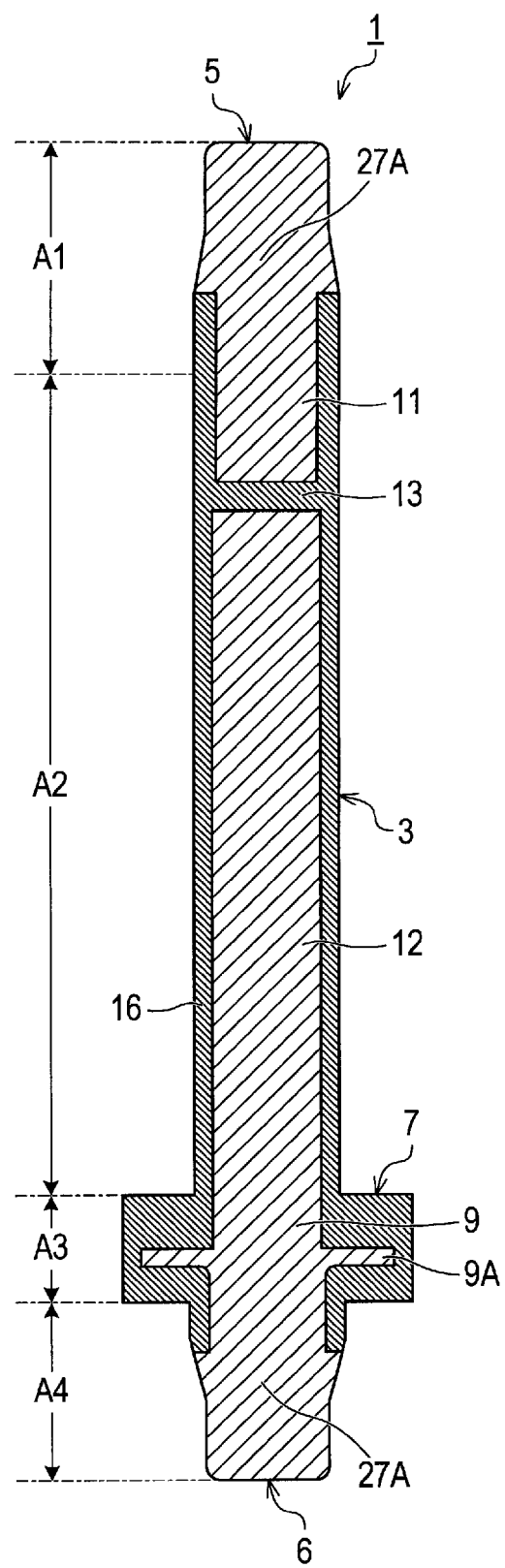
FIG. 2B is a cross-sectional view of a cutout site illustrated by line IIB-IIB in FIG. 1C.

As illustrated in FIGS. 2A and 2B, a connection portion 9 is provided inside the spacer 7. The connection portion 9 passes through the inside of the spacer 7 and is connected to both the shaft portion 3 and the second fixing portion 6. A flanged portion 9A is provided on an outer periphery of the connection portion 9, and the flanged portion 9A is embedded inside the spacer 7.

As illustrated in FIGS. 2A and 2B, the shaft portion 3 includes a first hard resin portion 11, a second hard resin portion 12, and a soft resin portion 13. The first hard resin portion 11 is made of a hard resin and is formed integrally with the first fixing portion 5. The second hard resin portion 12 is made of a hard resin and is formed integrally with the connection portion 9 and the second fixing portion 6. In the case of this embodiment, any of the first fixing portion 5, the second fixing portion 6, the connection portion 9, the first hard resin portion 11, and the second hard resin portion 12 as described above is made of a polypropylene resin (PP) corresponding to an example of a hard resin.

The soft resin portion 13 is made of a soft resin and is interposed between the first hard resin portion 11 and the second hard resin portion 12. The first hard resin portion 11 and the second hard resin portion 12 are connected by this soft resin portion 13. In addition, the soft resin portion 13 includes a covering layer 16 configured to partially cover the outer peripheral side of the first hard resin portion 11 and to entirely cover the outer peripheral side of the second hard resin portion 12. In the case of this embodiment, the soft resin portion 13 is made of a styrene-based thermoplastic elastomer (TPS) corresponding to an example of a soft resin. Therefore, the soft resin portion 13 can dampen vibration transmitted from either the first hard resin portion 11 or the second hard resin portion 12 to the other.

The first hard resin portion 11 is provided with a regulating portion 17. This regulating portion 17 comes into contact with a contact site 19 on the second hard resin portion 12 side when the first hard resin portion 11 displaces away from the second hard resin portion 12 along the axial direction of the shaft portion 3. As a result, the regulating portion 17 can regulate displacement of the first hard resin portion 11 further away from the second hard resin portion 12.

In the case of this embodiment, the second hard resin portion 12 includes a trunk portion 21, a neck portion 23, and a head portion 25. The connection portion 9 is connected to the trunk portion 21. The neck portion 23 extends from the trunk portion 21 toward the first hard resin portion 11 side. The neck portion 23 is smaller than the trunk portion 21 in a dimension in the width direction (direction orthogonal to the axial direction of the shaft portion 3; same hereafter). The head portion 25 is provided on the opposite side as the trunk portion 21 so as to sandwich the neck portion 23. The head portion 25 is larger than the neck portion 23 in the dimension in the width direction.

The regulating portion 17 described above includes a gap 17A. The gap 17A is larger than the neck portion 23 and smaller than the head portion 25 in the dimension in the width direction. The neck portion 23 described above passes through this gap 17A. As a result, the regulating portion 17 comes into contact with the head portion 25 including a contact site 19, when the first hard resin portion 11 displaces away from the second hard resin portion 12 along the axial direction of the shaft portion 3.

The first fixing portion 5 and the second fixing portion 6 each include a snap portion 27. The snap portion 27 includes a support column 27A and a pair of elastic check pieces 27B and 27B extending in a direction folding back from a tip of the support column 27A. A tip of each elastic check piece 27B forms a fitting site 29 configured to come into contact with a fitted site when the snap portion 27 is fitted into the fitted site, and this fitting site 29 is made of a soft resin having a property of dampening vibration.

Note that in the case of this embodiment, the first fixing portion 5 and the second fixing portion 6 each include the snap portion 27 as described above, but the snap portion 27 as described above may adopt a structure in which the snap portion 27 can be fixed to a fixing site by a different mechanism. For example, when the fixing site is provided with a screw hole (female screw), a screw shaft (male screw) may be adopted as the first fixing portion 5 and the second fixing portion 6. Alternatively, a screw shaft (male screw) may be adopted as the first fixing portion 5 and the second fixing portion 6, and a through-hole into which the screw shaft can be inserted may be provided at the fixing site. Then, the first fixing portion 5 and the second fixing portion 6 may be fixed to the fixing site by using a nut configured to screw onto the screw shaft passing through the through-hole.

Alternatively, the fixing site may be provided with a through-hole or a bottomed hole, and a column-like portion configured to be pressed into the through-hole or the bottomed hole may be provided as the first fixing portion 5 and the second fixing portion 6. Then, the first fixing portion 5 and the second fixing portion 6 may be fixed to the fixing site by fitting the column-like portion into the through-hole or the bottomed hole. These structures can be adopted as necessary for each of the first fixing portion 5 and the second fixing portion 6, and both the first fixing portion 5 and the second fixing portion 6 may have the same structure, or different structures may be adopted for the first fixing portion 5 and the second fixing portion 6.

Figure 3A:
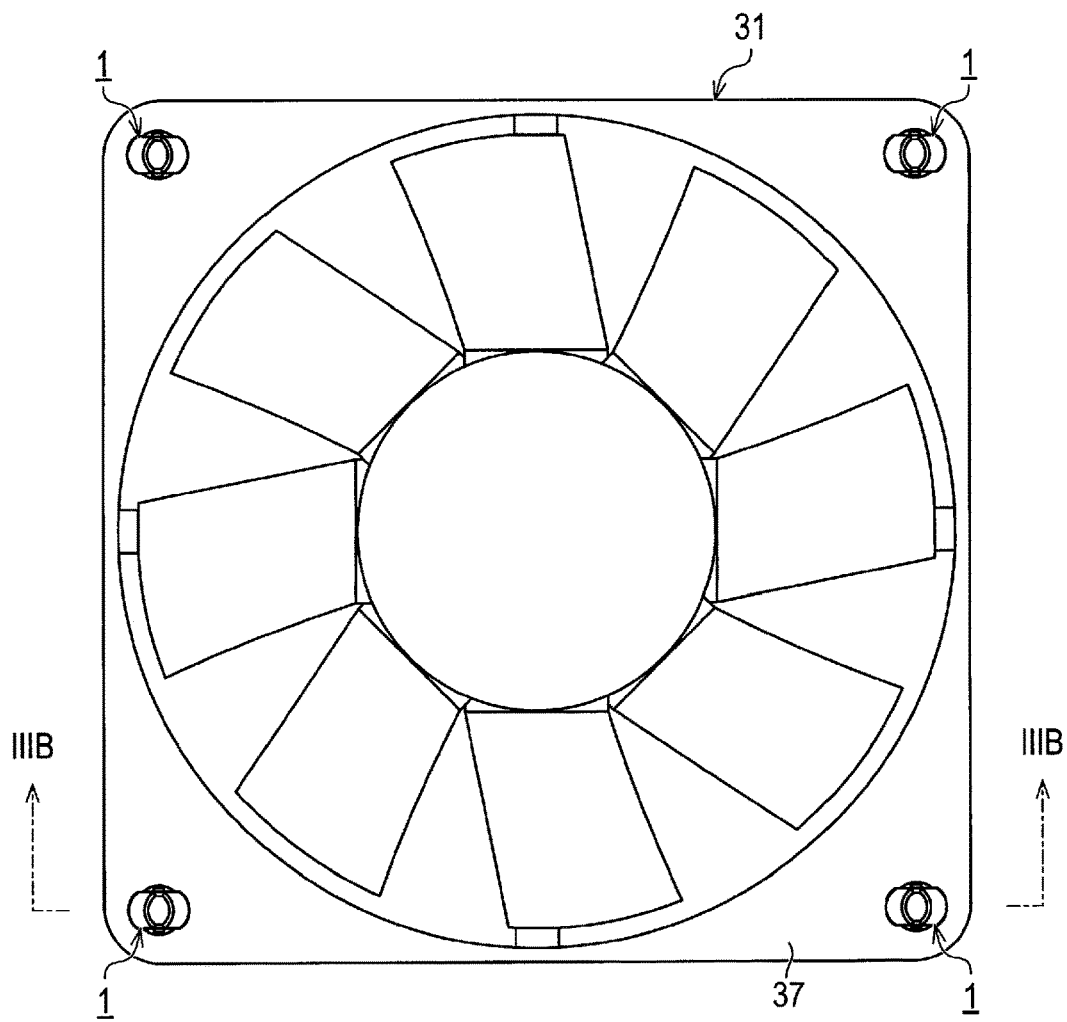
FIG. 3A is a plan view illustrating a usage state of the fixture of the first embodiment.
Figure 3B:
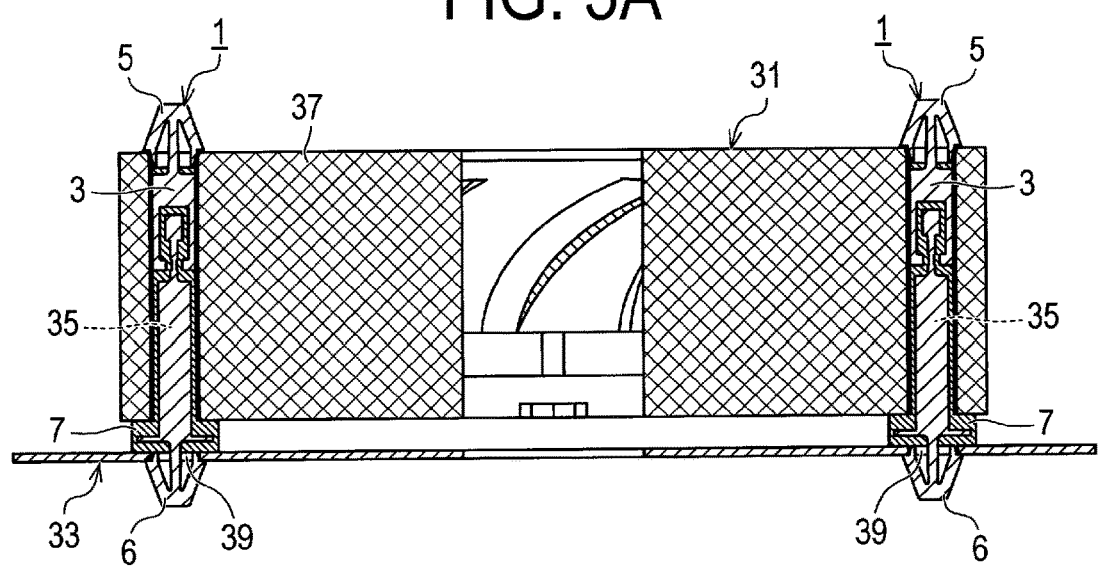
FIG. 3B is a cross-sectional view of a cutout site illustrated by line IIIB-IIIB in FIG. 3A.

The fixture 1 configured as described above is used, for example, to fix a fan 31 to a panel 33, as illustrated in FIGS. 3A and 3B. In this embodiment, shaft holding portions 35 are provided in four corners of the fan 31. Each shaft holding portion 35 in this embodiment is a through-hole through which an outer frame 37 of the fan 31 passes. As a result, when the shaft portion 3 of the fixture 1 is inserted into the shaft holding portion 35, the shaft holding portion 35 can hold the shaft portion 3 to prevent the shaft portion 3 from displacing in a direction other than the axial direction.

In addition, when the shaft portion 3 of the fixture 1 is inserted into the shaft holding portion 35, the snap portion 27 of the first fixing portion 5 elastically deforms, and the elastically deformed shape is restored after the shaft portion 3 has passed through the shaft holding portion 35. As a result, the snap portion 27 of the first fixing portion 5 is fitted into the fitted site on a periphery of the through-hole serving as the shaft holding portion 35, and the shaft portion 3 is prevented from being pulled out from the shaft holding portion 35. In addition, the spacer 7 comes into contact with the fan 31 at the inlet side of the shaft holding portion 35. Therefore, the shaft portion 3 is prevented from being pressed further into the shaft holding portion 35. Accordingly, the fixture 1 is fixed to the fan 31 according to these configurations.

On the other hand, the snap portion 27 of the second fixing portion 6 is inserted into an attachment hole 39 provided in the panel 33. At this time, the snap portion 27 of the second fixing portion 6 elastically deforms, and the elastically deformed shape is restored after the snap portion 27 has passed through the attachment hole 39. As a result, the snap portion 27 of the second fixing portion 6 is fitted into the fitted site on a periphery of the attachment hole 39, and the snap portion 27 of the second fixing portion 6 is prevented from being pulled out from the attachment hole 39. In addition, the spacer 7 comes into contact with the panel 33 on the inlet side of the attachment hole 39. Therefore, the snap portion 27 of the second fixing portion 6 is prevented from being pressed further into the attachment hole 39. Accordingly, the fixture 1 is fixed to the panel 33 according to these configurations.

As a result of the above, the fixture 1 fixes the fan 31 to the panel 33. In this state, the spacer 7 is sandwiched between the fan 31 and the panel 33 so as to secure a space between the fan 31 and the panel 33. Therefore, the fan 31 and the panel 33 do not come into direct contact with each other, and even when the fan 31 vibrates at the time of activation of the fan 31, this vibration is not transmitted directly from the fan 31 to the panel 33.

In addition, the spacer 7 is made of a soft resin having a property of dampening vibration. Therefore, even when vibration of the fan 31 is transmitted to the spacer 7, the vibration can be dampened in the spacer 7, and the vibration can be prevented from being transmitted to the panel 33 side. In addition, the shaft portion 3 includes the structure in which the soft resin portion 13 having a property of dampening vibration is interposed between the first hard resin portion 11 and the second hard resin portion 12. Therefore, even when vibration of the fan 31 is transmitted to the first hard resin portion 11, the vibration can be dampened in the soft resin portion 13, and the vibration can be prevented from being transmitted to the second hard resin portion 12 side.

In addition, the covering layer 16 made of a soft resin partially covers the outer peripheral side of the first hard resin portion 11 and entirely covers the outer peripheral side of the second hard resin portion 12. Therefore, even when vibration of the fan 31 is transmitted to the covering layer 16, the vibration can be dampened in the covering layer 16, and the vibration can be prevented from being transmitted to the first hard resin portion 11 and the second hard resin portion 12 side. Thereby, a vibration-absorbing effect or a vibration-damping effect can be enhanced. In addition, when the snap portion 27 provided on each of the first fixing portion 5 and the second fixing portion 6 is fitted into the fitted site, the fitting site 29 made of a soft resin and located at the tip of the elastic check piece 27B comes into contact with the fitted site. Therefore, even when vibration of the fan 31 is transmitted to the fitting site 29, the vibration can be dampened in the fitting site 29 made of a soft resin, and the vibration can be prevented from being transmitted to the snap portion 27 side. Note that the fixture 1 is excellent in both a vibration-absorbing effect and a vibration-damping effect. Therefore, the fixture 1 can be used as a vibration-absorbing fixture and can also be used as a vibration-damping fixture.

Further, according to the fixture 1 described above, even in a case where the spacer 7 breaks, the second hard resin portion 12 is provided integrally with the connection portion 9 and the second fixing portion 6. Therefore, disconnection between the second fixing portion 6 and the second hard resin portion 12 will not be caused. In addition, even in a case where the soft resin portion 13 breaks in the shaft portion 3, the shaft holding portion 35 will hold the second hard resin portion 12. Accordingly, the state in which the shaft portion 3 is held by the shaft holding portion 35 can be maintained, and the fan 31 can be prevented from falling off the panel 33.

Figure 4A:
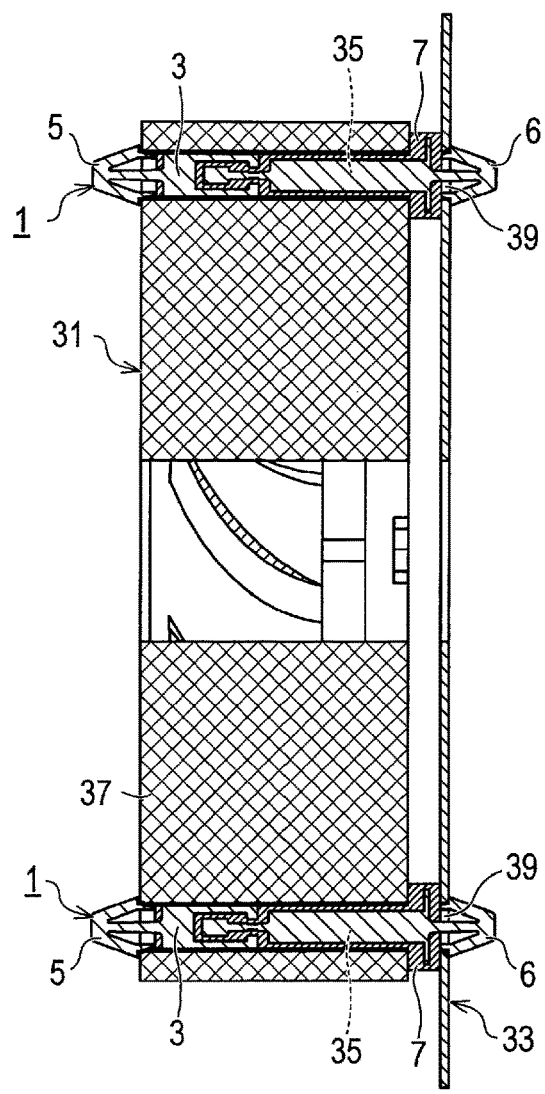
FIG. 4A is a cross-sectional view illustrating another usage state of the fixture of the first embodiment.

In particular, as illustrated in FIG. 4A, when the fan 31 is fixed to a side face of the panel 33 that is perpendicular, shearing force originating from a load from the fan 31 acts on the spacer 7 between the second fixing portion 6 fixed to the panel 33 and the shaft portion 3 passing through the shaft holding portion 35 of the fan 31. Therefore, when a portion made of a hard resin is discontinuous inside this spacer 7, the spacer 7 easily breaks under the shearing force. In this regard, in the case of the fixture 1 of this embodiment, the connection portion 9 is provided inside the spacer 7, and the range from the second fixing portion, through the connection portion 9, to the second hard resin portion 12 is made of a hard resin. As a result, breaking in the spacer 7 can be prevented.

On the other hand, the soft resin portion 13 is interposed between the first hard resin portion 11 and the second hard resin portion 12, and the portion made of a hard resin is discontinuous here. However, the soft resin portion 13 is a portion disposed inside the shaft holding portion 35. As a result, in comparison to the spacer 7, the soft resin portion 13 is not a site on which large shearing force acts, and breaking of the soft resin portion 13 is prevented. In other words, even in the case where the soft resin portion 13 breaks inside the shaft holding portion 35, the regulating portion 17 comes into contact with the head portion 25 including the contact site 19 when the first hard resin portion 11 displaces away from the second hard resin portion 12 along the axial direction of the shaft portion 3.

As a result, the regulating portion 17 regulates displacement of the first hard resin portion 11 further away from the second hard resin portion 12. As a result, the fan 31 does not move further away from the second hard resin portion 12 together with the first hard resin portion 11, and the fan 31 can be prevented from falling off the panel 33.

Figure 4B:
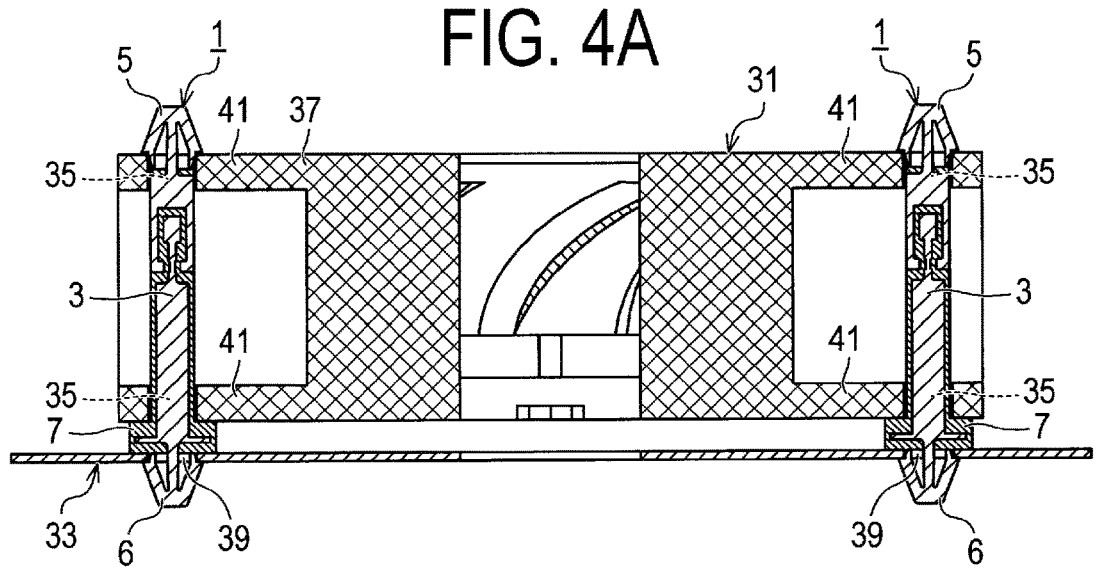
FIG. 4B is a cross-sectional view illustrating yet another usage state of the fixture of the first embodiment.
Figure 5A:
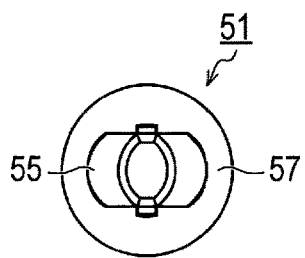
FIG. 5A is a plan view of a fixture of a second embodiment.
Figure 5B:
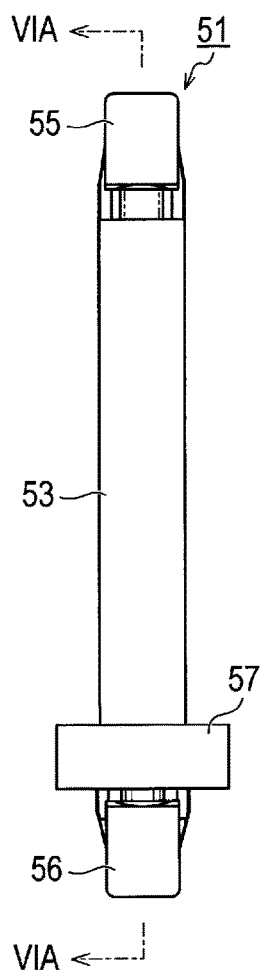
FIG. 5B is a left side view of the fixture of the second embodiment.
Figure 5C:
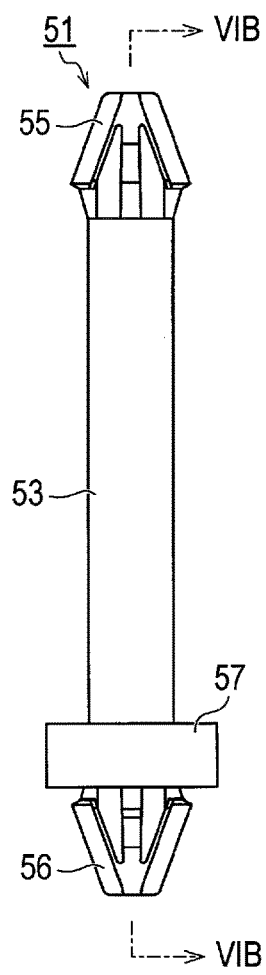
FIG. 5C is a front view of the fixture of the second embodiment.
Figure 5E:
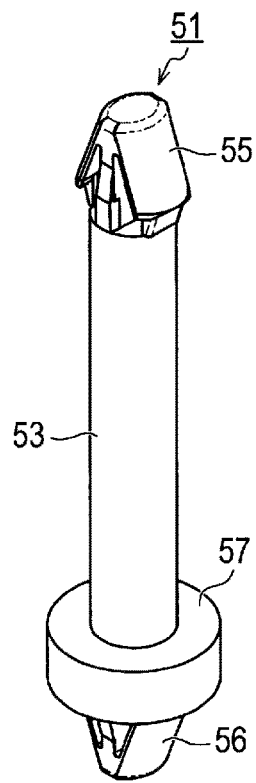
FIG. 5E is a perspective view of the fixture of the second embodiment.
Figure 5D:
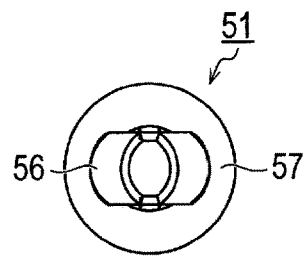
FIG. 5D is a bottom view of the fixture of the second embodiment.

Note that the first embodiment described above describes the example in which a single through-hole through which the outer frame 37 of the fan 31 passes is provided as the shaft holding portion 35 provided on the fan 31, but the specific structure of the shaft holding portion 35 is not limited to the single through-hole. For example, as illustrated in FIG. 4B, when the structure in which the outer frame 37 of the fan 31 includes flanged portions 41 and 41 is adopted, a through-hole through which each flanged portion 41 passes may be provided coaxially as the shaft holding portion 35, and the shaft holding portion 35 may include the two through-holes formed coaxially.

When such a shaft holding portion 35 is used, the fixture 1 can receive shearing force acting on the spacer 7 with the connection portion 9 or the like, as described above. As a result, breaking of the spacer 7 can be prevented. In addition, the soft resin portion 13 interposed between the first hard resin portion 11 and the second hard resin portion 12 is disposed between the two through-holes serving as the shaft holding portion 35. As a result, in comparison to the spacer 7, large shearing force does not act on the soft resin portion 13, and breaking of the soft resin portion 13 is prevented. Further, even in the case where the soft resin portion 13 breaks, the regulating portion 17 comes into contact with the head portion 25 including the contact site 19 when the first hard resin portion 11 displaces away from the second hard resin portion 12 along the axial direction of the shaft portion 3. As a result, the fan 31 can be prevented from falling off the panel 33.

(2) Second Embodiment

A second embodiment will be described next. Note that since the second embodiment is simply a modification of a portion of the configuration exemplified in the first embodiment, differences from the first embodiment will be described mainly in detail, and detailed description of the same portions as those of the first embodiment will be omitted.

As illustrated in FIGS. 5A to 5E, a fixture 51 includes a shaft portion 53, a first fixing portion 55, a second fixing portion 56, and a spacer 57. Note that, as illustrated in FIGS. 6A and 6B, in a direction aligned with the axial direction of the shaft portion 53, the first fixing portion 55 is disposed in range A1, the shaft portion 53 is disposed in range A2, the spacer 57 is disposed in range A3, and the second fixing portion 56 is disposed in range A4.

Figure 6A:
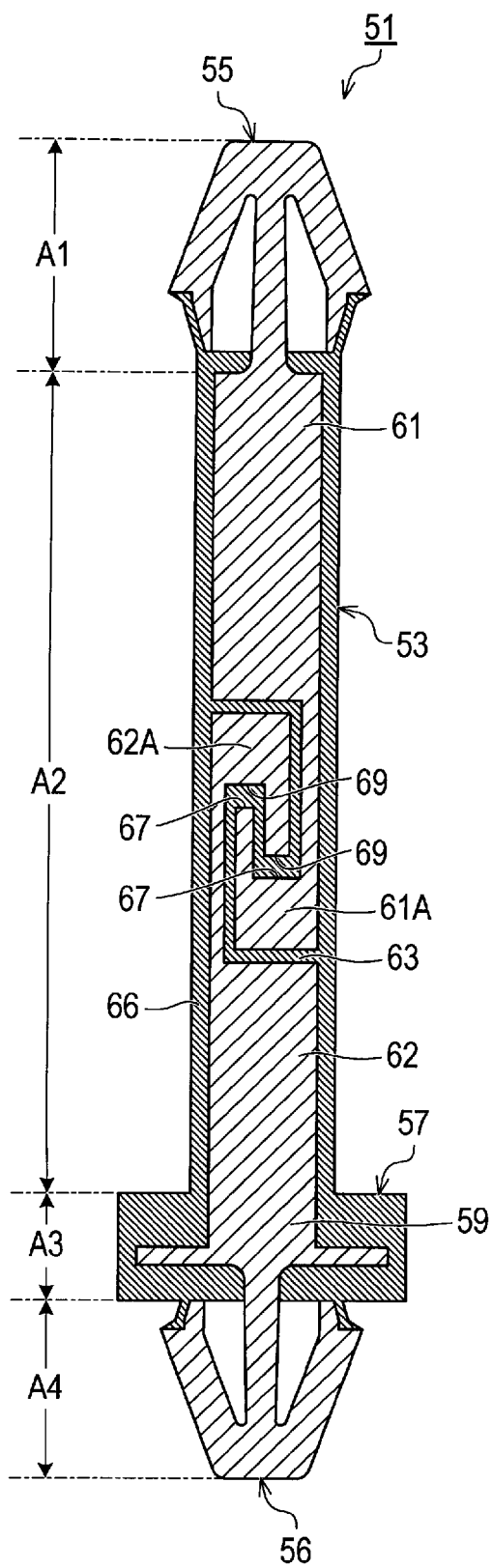
FIG. 6A is a cross-sectional view of a cutout site illustrated by line VIA-VIA in FIG. 5B.
Figure 6B:
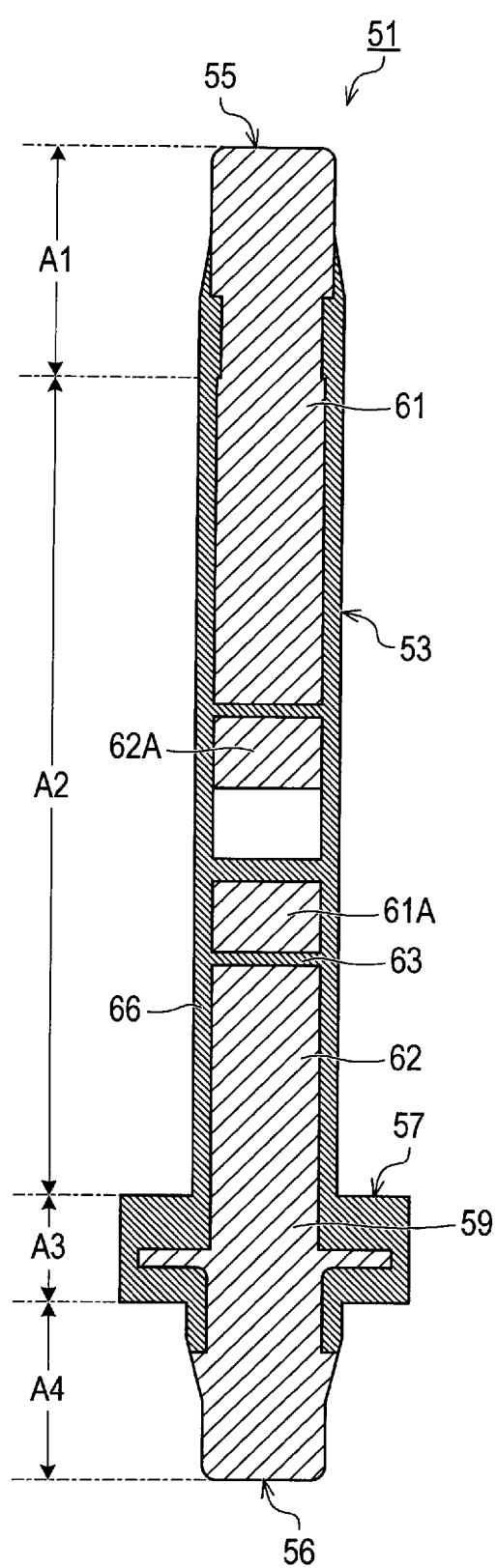
FIG. 6B is a cross-sectional view of a cutout site illustrated by line VIB-VIB in FIG. 5C.
Figure 7A:
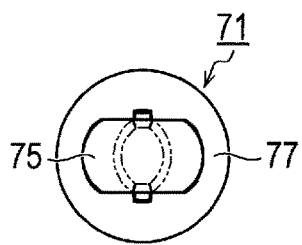
FIG. 7A is a plan view of a fixture of a third embodiment.
Figure 7B:
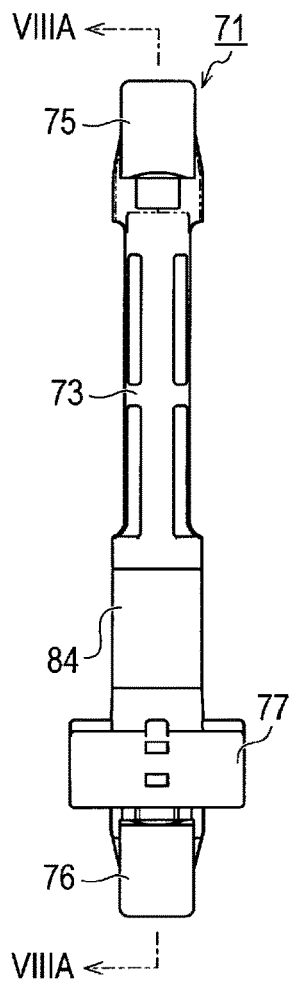
FIG. 7B is a left side view of the fixture of the third embodiment.
Figure 7C:
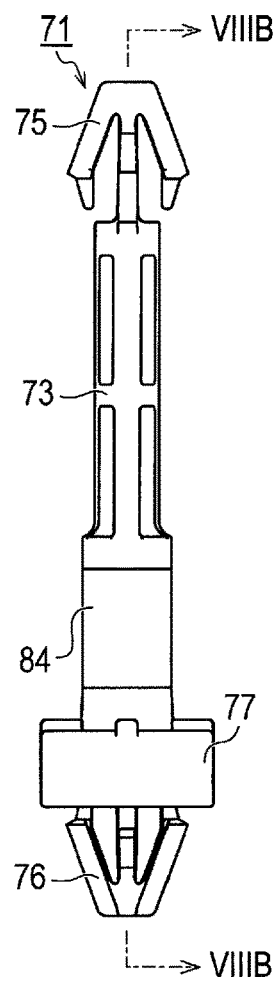
FIG. 7C is a front view of the fixture of the third embodiment.
Figure 7E:
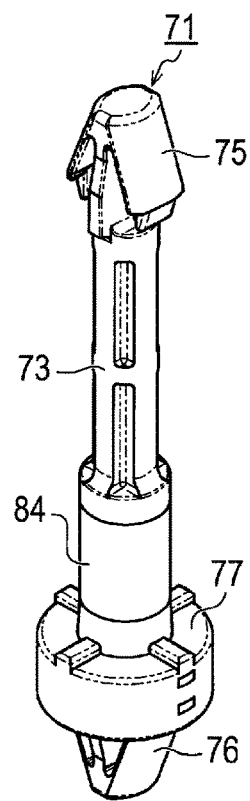
FIG. 7E is a perspective view of the fixture of the third embodiment.
Figure 7D:
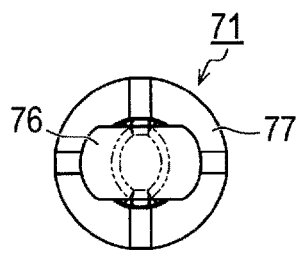
FIG. 7D is a bottom view of the fixture of the third embodiment.

As illustrated in FIGS. 6A and 6B, a connection portion 59 is provided inside the spacer 57. Of these structures, the first fixing portion 55, the second fixing portion 56, the spacer 57, and the connection portion 59 include roughly the same configurations as the configurations of the first fixing portion 5, the second fixing portion 6, the spacer 7, and the connection portion 9 exemplified in the first embodiment.

On the other hand, the shaft portion 53 includes a structure different from the structure of the shaft portion 3 exemplified in the first embodiment. More specifically, as illustrated in FIGS. 6A and 6B, the shaft portion 53 illustrated in the second embodiment includes a first hard resin portion 61, a second hard resin portion 62, and a soft resin portion 63. This embodiment is similar to the first embodiment in that the first hard resin portion 61 and the second hard resin portion 62 are made of a hard resin and the soft resin portion 63 is made of a soft resin. The soft resin portion 63 includes a covering layer 66 configured to entirely cover the outer peripheral side of the first hard resin portion 61 and to entirely cover the outer peripheral side of the second hard resin portion 62.

The first hard resin portion 61 is provided with a regulating portion 67. This regulating portion 67 comes into contact with a contact site 69 on the second hard resin portion 62 side when the first hard resin portion 61 displaces away from the second hard resin portion 62 along the axial direction of the shaft portion 53. As a result, displacement of the first hard resin portion 61 further away from the second hard resin portion 62 can be regulated by the regulating portion 67.

In the case of this embodiment, a first hook portion 61A is provided on the first hard resin portion 61, and a second hook portion 62A is provided on the second hard resin portion 62. The first hook portion 61A and the second hook portion 62A are located to be hooked to each other when the first hook portion 61A and the second hook portion 62A displace away from each other along the axial direction of the shaft portion 53. Therefore, when the first hard resin portion 61 displaces away from the second hard resin portion 62, the regulating portion 67 comes into contact with the contact site 69 and can regulate further displacement of the first hard resin portion 61.

The fixture 51 configured as described above also exhibits the same operation and effects as the operation and effects of the fixture 1 exemplified in the first embodiment. Accordingly, a first object can be fixed to a second object, and in this case, vibration transmitted from either the first object or the second object to the other can be dampened. In addition, shearing force acting on the spacer 57 is unlikely to cause the spacer 57 to break and is also unlikely to cause the soft resin portion 63 provided on the shaft portion 53 to break as long as the shaft portion 53 is held by a shaft holding portion. As a result, the first object can be prevented from falling off the second object. Further, even in a case where the soft resin portion 63 provided on the shaft portion 53 breaks, the regulating portion 67 regulates displacement of the first hard resin portion 61 in this case. As a result, the first object can be prevented from falling off together with the first hard resin portion 61.

(3) Third Embodiment

Figure 8A:
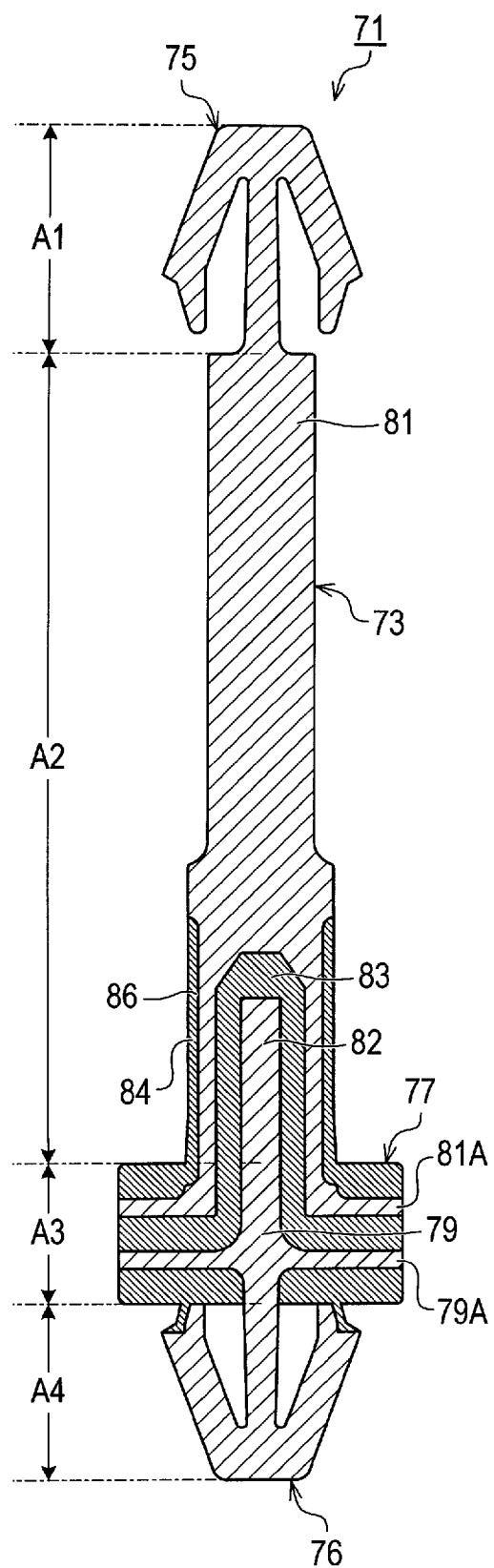
FIG. 8A is a cross-sectional view of a cutout site illustrated by line VIIIA-VIIIA in FIG. 7B.
Figure 8B:
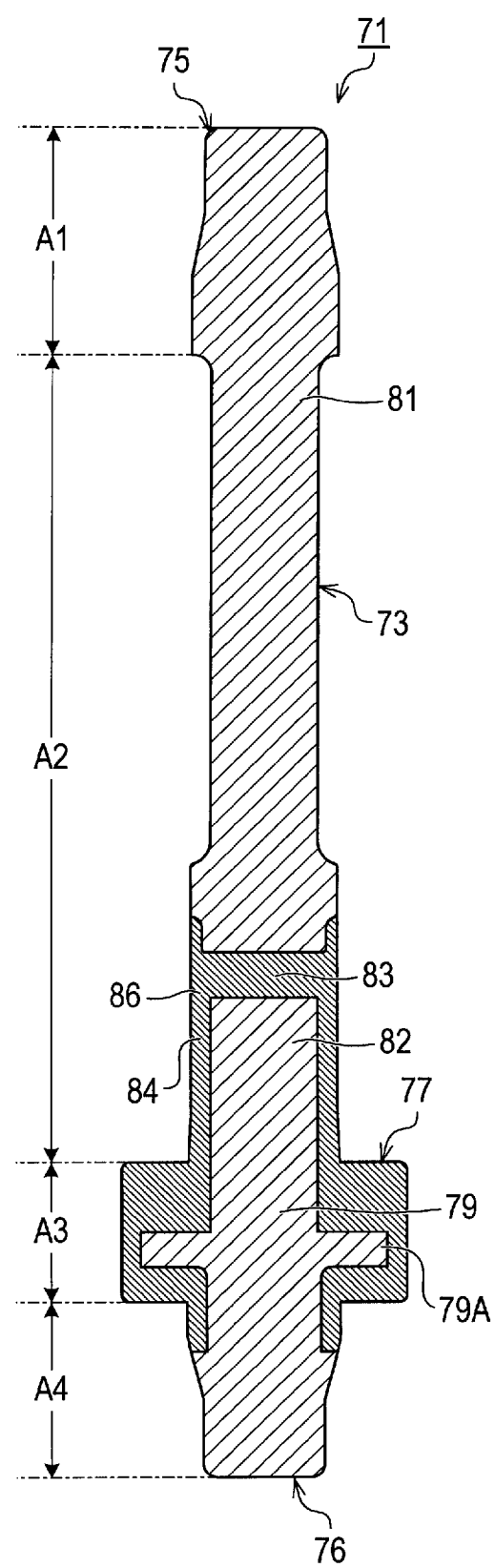
FIG. 8B is a cross-sectional view of a cutout site illustrated by line VIIIB-VIIIB in FIG. 7C.

A third embodiment will be described next. As illustrated in FIGS. 7A to 7E, a fixture 71 includes a shaft portion 73, a first fixing portion 75, a second fixing portion 76, and a spacer 77. As illustrated in FIGS. 8A and 8B, a connection portion 79 is provided inside the spacer 77. Note that in a direction aligned with the axial direction of the shaft portion 73, the first fixing portion 75 is disposed in range A1, the shaft portion 73 is disposed in range A2, the spacer 77 is disposed in range A3, and the second fixing portion 76 is disposed in range A4.

The shaft portion 73 includes a first hard resin portion 81, a second hard resin portion 82, and a soft resin portion 83. That is, the first hard resin portion 81, the second hard resin portion 82, and the soft resin portion 83 each include at least a portion disposed in the range A2 described above, and the shaft portion 73 includes this portion. This embodiment is similar to the first embodiment in that the first hard resin portion 81 and the second hard resin portion 82 are made of a hard resin and the soft resin portion 83 is made of a soft resin.

In addition, the shaft portion 73 includes a large-diameter portion 84, and the large-diameter portion 84 is a part of the shaft portion 73 and has a larger outside diameter than outside diameters of portions other than this part. The large-diameter portion 84 is provided at a position closer to the spacer 77 than the first fixing portion 75 of the shaft portion 73. That is, the shaft portion 75 includes a portion positioned close to the spacer 77 and serving as the large-diameter portion 84, and the remaining portion positioned close to the first fixing portion 75 and having a shape with a smaller outside diameter than the outside diameter of the large-diameter portion 84. The soft resin portion 83 includes a covering layer 86 configured to cover the outer peripheral side of the first hard resin portion 81 at the large-diameter portion 84.

One end of the first hard resin portion 81 extends beyond the range A2 to the range A3 side and reaches the inside of the spacer 77. A plate-like portion 81A is provided at the one end of the first hard resin portion 81 inside the spacer 77. The plate-like portion 81A is a plate-like portion with a plate thickness direction aligned with the axial direction of the shaft portion 73. The plate-like portion 81A is embedded in the soft resin forming the spacer 77.

The first fixing portion 75 is made of a hard resin and is formed integrally with the first hard resin portion 81. In the case of the third embodiment, the first fixing portion 75 includes a structure corresponding to the snap portion 27 exemplified in the first embodiment (that is, a portion made of a hard resin), but does not include a structure corresponding to the fitting site 29 exemplified in the first embodiment (that is, a portion made of a soft resin). However, also in the third embodiment, the first fixing portion 75 may have the structure corresponding to the fitting site 29 exemplified in the first embodiment (that is, a portion made of a soft resin). The second fixing portion 76 includes roughly the same configuration as the configuration of the second fixing portion 6 exemplified in the first embodiment, and includes a portion made of a hard resin and a portion made of a soft resin.

At least a contact site of the spacer 77 in contact with other members is made of a soft resin, and the connection portion 79 is disposed inside the portion made of the soft resin. The connection portion 79 passes through the inside of the spacer 77 in the range A3, and one end of the connection portion 79 is connected to the second hard resin portion 82 forming the shaft portion 73, and the other end of the connection portion 79 is connected to a portion made of a hard resin of the second fixing portion 76. The second hard resin portion 82, the connection portion 79, and the portion made of a hard resin of the second fixing portion 76 are made of a hard resin and formed integrally with one another. A flanged portion 79A is provided on an outer periphery of the connection portion 79 inside the spacer 77. The flanged portion 79A is a plate-like portion with a plate thickness direction aligned with the axial direction of the shaft portion 73. The flanged portion 79A is embedded in the soft resin forming the spacer 77. The soft resin forming the spacer 77 is interposed between the flanged portion 79A and the plate-like portion 81A.

The fixture 71 configured as described above also exhibits the same operation and effects as the operation and effects of the fixture 1 exemplified in the first embodiment or the fixture 51 exemplified in the second embodiment. Accordingly, a first object can be fixed to a second object, and in this case, vibration transmitted from either the first object or the second object to the other can be dampened. In addition, shearing force acting on the spacer 77 is unlikely to cause the spacer 77 to break and is also unlikely to cause the soft resin portion 83 provided on the shaft portion 73 to break as long as the shaft portion 73 is held by a shaft holding portion. As a result, the first object can be prevented from falling off the second object.

Figure 9:
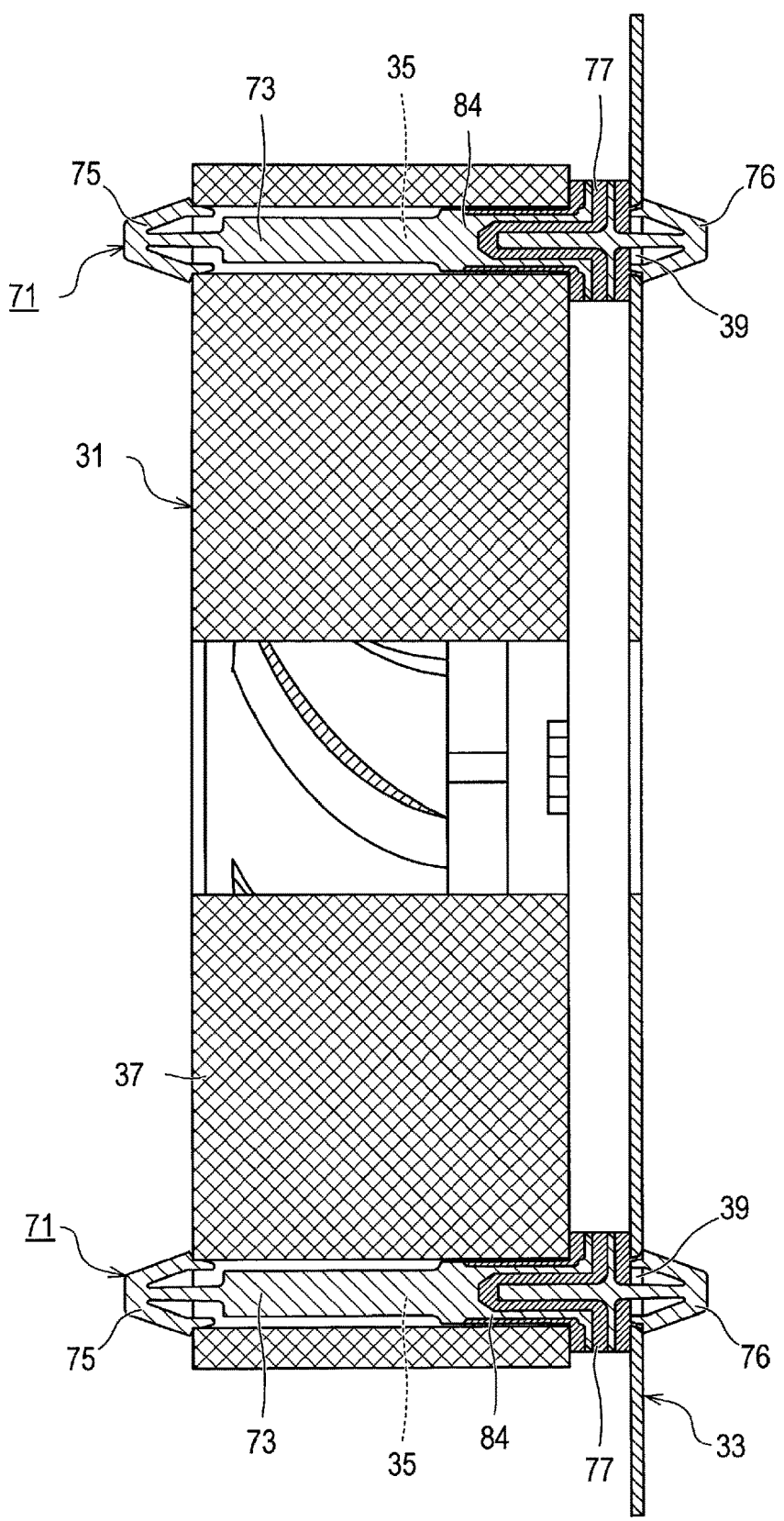
FIG. 9 is a cross-sectional view illustrating a usage state of the fixture of the third embodiment.

For example, as illustrated in FIG. 9, when a fan 31 is fixed to a side face of a panel 33 that is perpendicular, shearing force originating from a load from the fan 31 acts on the spacer 77 between the second fixing portion 76 fixed to the panel 33 and the shaft portion 73 passing through a shaft holding portion 35 of the fan 31.

Therefore, when a portion made of a hard resin is discontinuous inside the spacer 77, the spacer 77 easily breaks under the shearing force. In this regard, in the case of the fixture 71 of the third embodiment, the connection portion 79 is provided inside the spacer 77, and the range extending from the second fixing portion 76, through the connection portion 79, to the second hard resin portion 82 is made of a hard resin. As a result, breaking in the spacer 77 can be prevented.

In addition, in the case of the third embodiment, structures corresponding to the regulating portion 17 and the contact site 19 in the first embodiment are not provided. Therefore, whereas displacement of the first hard resin portion 11 away from the second hard resin portion 12 can be regulated by the regulating portion 17 and the contact site 19 in the case of the first embodiment, the third embodiment does not have an effect equivalent to the effect of the first embodiment in this regard. However, in the case of the third embodiment, a shape of the second hard resin portion 82 can be simplified to the extent that structures corresponding to the regulating portion 17 and the contact site 19 are not provided. Therefore, in the case of the third embodiment, the second hard resin portion 82 is formed into a plate-like shape, and can have a plate thickness greater than in a case in which the regulating portion 17 and the contact site 19 are provided. Accordingly, shearing force originating from a load from the fan 31 described above can be received by the second hard resin portion 82 having a large plate thickness.

In addition, in the case of the third embodiment, the plate-like portion 81A is embedded in the spacer 77 in addition to the flanged portion 79A. Accordingly, contact is made with a soft resin portion forming the spacer 77 on a larger surface than surfaces of the regulating portion 17 and the contact site 19 exemplified in the first embodiment, and displacement of the shaft portion 73 and the second fixing portion 76 in the axial direction with respect to the spacer 77 can be regulated appropriately. As a result, for example, when the fixture 71 is pulled in the axial direction, the fixture 71 can be prevented from breaking.

Further, in the case of the third embodiment, the fan 31 can be supported by the large-diameter portion 84. That is, portions other than the large-diameter portion 84 of the shaft portion 73 can include a structure in which these portions and an inner periphery of the shaft holding portion do not come into contact. Therefore, when the fan 31 vibrates, force acting on the shaft portion 73 from the fan 31 acts mainly on the large-diameter portion 84 positioned close to the spacer 77. Accordingly, in comparison to a case in which the same force acts on the shaft portion 73 near the first fixing portion 75, the force can be prevented from acting at positions away from a fulcrum point of the shaft portion 73 located in the vicinity of the spacer 77, and generation of vibration in the fixture 71 can be prevented.

(4) Addendum

Exemplary embodiments of the fixture are described above, but the embodiments described above are merely an aspect of the present disclosure. In other words, the present disclosure is not limited to the exemplary embodiments described above and can be embodied in various forms without departing from the technical concept of the present disclosure.

For example, in the embodiments described above, two embodiments were exemplified with regard to the specific shape of the regulating portion, but a shape differing from the shape in the two embodiments described above may further be employed as long as functional equivalence can be realized.

In addition, in the embodiments described above, a polypropylene resin (PP) is described as an example of a hard resin, but a hard resin other than a polypropylene may be used. More particularly, a resin material having a higher hardness than a soft resin can be used as a hard resin, and any hard plastic material capable of securing rigidity, elasticity, dimensional stability, and the like required of the fixture can be used. More specifically, a resin material having hardness of 90 or higher according to JIS A may be used, and examples of the resin material include, in addition to a polypropylene resin, a polyacetal resin (POM), a polyamide resin (PA), an acrylonitrile-butadiene-styrene copolymer resin (ABS), and other engineering plastics. As necessary, the hard resin forming the first fixing portion and the first hard resin portion may be a hard resin different from the hard resin forming the second fixing portion, the connection portion, and the second hard resin portion.

In addition, in the embodiments described above, a styrene-based thermoplastic elastomer (TPS) is described as an example of a soft resin, but a soft resin other than TPS may be used. More particularly, any of various types of elastomer materials capable of dampening vibration by converting the vibrational energy to heat can be used as the soft resin. Both a thermoplastic elastomer and a thermosetting elastomer (for example, synthetic rubber or natural rubber) can be used as the elastomer material. More specifically, for example, any thermoplastic elastomer and thermosetting elastomer having a loss factor of approximately 0.1 or greater and hardness of approximately 0 to 40 in terms of JIS A can be used. Specific examples of the thermoplastic elastomer can include, in addition to a styrene-based elastomer, various types of thermoplastic elastomers such as an olefin elastomer, an ester elastomer, an amide elastomer, and a urethane elastomer, and can further include a hydrogenated modified product or the like of these various types of thermoplastic elastomers. Specific examples of the thermosetting elastomer can include styrene-butadiene rubber, butadiene rubber, chloroprene rubber, nitrile-butadiene rubber, butyl rubber, urethane rubber, silicone rubber, fluorine rubber, and acrylic rubber. These soft resins may be used alone, or two or more compatible resins of these soft resins may be blended and used.

In addition, in the embodiments described above, the fan is described as the first object, but the first object may be an article other than the fan. Further, the panel is described as the second object, but the second object may be an article other than the panel. In addition, in the embodiments described above, the fan is exemplified as the first object. As a result, the first object serves as a source of vibration, but the fixture described above may be used in a case in which the second object is a source of vibration and vibration of the second object is to be prevented from being transmitted to the first object.

Note that, as is clear from the exemplary embodiments described above, the fixture of the present disclosure may further include the following configurations.

First, in the fixture of the present disclosure, the first hard resin portion may be provided with a regulating portion. The regulating portion comes into contact with a contact site on the second hard resin portion side when the first hard resin portion displaces away from the second hard resin portion along an axial direction of the shaft portion so that displacement of the first hard resin portion further away from the second hard resin portion can be regulated.

According to the fixture configured in this way, for example even in the case where the soft resin portion breaks and in this case the first hard resin portion displaces away from the second hard resin portion along the axial direction of the shaft portion, the regulating portion comes into contact with the contact site on the second hard resin portion side. As a result, the regulating portion regulates displacement of the first hard resin portion further away from the second hard resin portion. As a result, the first object can be prevented from moving away from the second hard resin portion together with the first hard resin portion and falling off the second object.

In addition, in the fixture of the present disclosure, the second hard resin portion may include a trunk portion, a neck portion, and a head portion. In this case, the connection portion is connected to the trunk portion. The neck portion extends from the trunk portion toward the first hard resin portion side, and is smaller than the trunk portion in dimension in a width direction orthogonal to the axial direction of the shaft portion. The head portion is provided on an opposite side as the trunk portion so as to sandwich the neck portion, and is greater than the neck portion in the dimension in the width direction. The regulating portion includes a gap being greater than the neck portion and smaller than the head portion in the dimension in the width direction. The neck portion passes through the gap and comes into contact with the head portion including the contact site when the first hard resin portion displaces away from the second hard resin portion along the axial direction of the shaft portion, so that displacement of the first hard resin portion further away from the second hard resin portion can be regulated.

According to the fixture configured in this way, for example even in the case where the soft resin portion breaks and in this case the first hard resin portion displaces away from the second hard resin portion along the axial direction of the shaft portion, the regulating portion comes into contact with the head portion including the contact site. As a result, the regulating portion regulates displacement of the first hard resin portion further away from the second hard resin portion. As a result, the first object can be prevented from moving away from the second hard resin portion together with the first hard resin portion and falling off the second object.

In addition, in the fixture of the present disclosure, the shaft portion may include a large-diameter portion. The large diameter portion is a part of the shaft portion, and has an outside diameter greater than outside diameters of portions other than the part. The large-diameter portion is provided at a position closer to the spacer than the first fixing portion of the shaft portion.

According to the fixture configured in this way, an inside diameter of the shaft holding portion is set to a dimension corresponding to the dimension of the large-diameter portion. As a result, the first object can be supported in the large-diameter portion. That is, portions other than the large-diameter portion of the shaft portion can include a structure in which these portions and an inner periphery of the shaft holding portion do not come into contact. Therefore, when the first object vibrates, force acting on the shaft portion from the first object acts mainly on the large-diameter portion positioned close to the spacer. Accordingly, in comparison to a case in which the same force acts on the shaft portion near the first fixing portion, the force can be prevented from acting at positions away from a fulcrum point of the shaft portion located in the vicinity of the spacer, and generation of vibration in the fixture can be prevented.

In addition, in the fixture of the present disclosure, a flanged portion may be provided on an outer periphery of the connection portion. In this case, the flanged portion is a plate-like portion with a plate thickness direction aligned with the axial direction of the shaft portion. The flanged portion is embedded in the spacer.

According to the fixture configured in this way, even when the connection portion is pulled in a direction aligned with the axial direction of the shaft portion, the connection portion is unlikely to displace relative to the spacer. Accordingly, when the fixture is pulled in the axial direction, the fixture can be prevented from breaking.

In addition, in the fixture of the present disclosure, one end of the first hard resin portion may reaches the inside of the spacer, and a plate-like portion may be provided at one end of the first hard resin portion. In this case, the plate-like portion is a plate-like portion with a plate thickness direction aligned with the axial direction of the shaft portion. The plate-like portion is embedded in the spacer.

According to the fixture configured in this way, even when the first hard resin portion is pulled in a direction aligned with the axial direction of the shaft portion, the first hard resin portion is unlikely to displace relative to the spacer. Accordingly, when the fixture is pulled in the axial direction, the fixture can be prevented from breaking.

In addition, in the fixture of the present disclosure, the soft resin portion may include a covering layer. The covering layer partially or entirely covers the outer peripheral side of at least one of the first hard resin portion and the second hard resin portion.

According to the fixture configured in this way, the outer peripheral side of at least one of the first hard resin portion and the second hard resin portion is partially or entirely covered by the covering layer made of a soft resin. Accordingly, vibration transmitted via the covering layer from one of the first hard resin portion or the second hard resin portion and the shaft holding portion to the other can be dampened at a site of the covering layer, and a vibration-absorbing effect or a vibration-dampening effect can be enhanced.

In addition, in the fixture of the present disclosure, at least one of the first fixing portion and the second fixing portion may include a snap portion. The snap portion is configured to elastically deform when the snap portion is inserted into a through-hole so that the elastically deformed shape is restored after the snap portion has passed through the through-hole, the snap portion is configured to be fitted into a fitted site on a periphery of the through-hole and to be prevented from being pulled out from the through-hole. In this case, the snap portion may include a fitting site configured to come into contact with the fitted site when the snap portion is fitted into a site on a periphery of the through-hole, and the fitting site may be made of a soft resin having a property of dampening vibration so that vibration transmitted from either the snap portion or the fitted site to the other can be dampened.

According to the fixture configured in this way, the first fixing portion or the second fixing portion can be fixed easily to an intended site by using the snap portion as described above. Moreover, the snap portion includes the fitting site as described above made of a soft resin. As a result, vibration transmitted from either the snap portion or the fitted site to the other can be dampened, and a vibration-absorbing effect or a vibration-dampening effect can be enhanced.

REFERENCE SIGNS LIST 1, 51, 71 Fixture
3, 53, 73 Shaft portion 5, 55, 75 First fixing portion
6, 56, 76 Second fixing portion
7, 57, 77 Spacer
9, 59, 79 Connection portion
9A, 79A Flanged portion
11, 61, 81 First hard resin portion
12, 62, 82 Second hard resin portion
13, 63, 83 Soft resin portion
16, 66, 86 Covering layer
17, 67 Regulating portion
17A Gap
19, 69 Contact site
21 Trunk portion
23 Neck portion
25 Head portion
27 Snap portion
27A Support column
27B Elastic check piece
29 Fitting site
31 Fan
33 Panel
35 Shaft holding portion
37 Outer frame
39 Attachment hole
41 Flanged portion
61A First hook portion
62A Second hook portion

The invention claimed is:

1. A fixture being used to fix a first object to a second object, the fixture comprising:
    a shaft portion;
    a first fixing portion;
    a spacer; and
    a second fixing portion,
    the shaft portion being formed into a column shape,
    the first fixing portion being provided at one end of the shaft portion,
    the spacer being provided at another end of the shaft portion,
    the second fixing portion being provided at a site on an opposite side as the shaft portion to sandwich the spacer,
    a connection portion being provided inside the spacer,
    the connection portion passing through the inside of the spacer and being connected to both the shaft portion and the second fixing portion,
    a shaft holding portion being provided on the first object, and the shaft holding portion being configured such that the shaft portion can be held by the shaft holding portion when the shaft portion is inserted into the shaft holding portion,
    the shaft portion being configured such that the shaft portion can be inserted into the shaft holding portion from the first fixing portion side,
    the first fixing portion being configured such that the first fixing portion can be fixed to the first object while the shaft portion is inserted in the shaft holding portion,
    the second fixing portion being configured such that the second fixing portion can be fixed to the second object,
    the spacer being configured such that when the first fixing portion is fixed to the first object and the second fixing portion is fixed to the second object, the spacer can be sandwiched between the first object and the second object to secure a space between the first object and the second object,
    the spacer being made of a soft resin having a property of dampening vibration such that vibration transmitted from either the first object or the second object to the other can be dampened,
    the shaft portion including a first hard resin portion, a second hard resin portion, and a soft resin portion,
    the first hard resin portion being made of a hard resin and provided integrally with the first fixing portion,
    the second hard resin portion being made of a hard resin and provided integrally with the connection portion and the second fixing portion,
    the soft resin portion being interposed between the first hard resin portion and the second hard resin portion to connect the first hard resin portion and the second hard resin portion, and
    the soft resin portion being made of a soft resin having a property of dampening vibration such that vibration transmitted from either the first hard resin portion or the second hard resin portion to the other can be dampened.

2. The fixture according to claim 1,
    wherein a regulating portion is provided on the first hard resin portion, and
    the regulating portion comes into contact with a contact site on the second hard resin portion side when the first hard resin portion displaces away from the second hard resin portion along an axial direction of the shaft portion such that displacement of the first hard resin portion further away from the second hard resin portion can be regulated.

3. The fixture according to claim 2,
    wherein the second hard resin portion includes a trunk portion, a neck portion, and a head portion,
    the connection portion is connected to the trunk portion,
    the neck portion extends from the trunk portion toward the first hard resin portion side, and is smaller than the trunk portion in a dimension in a width direction orthogonal to the axial direction of the shaft portion,
    the head portion is provided on an opposite side as the trunk portion to sandwich the neck portion, and is greater than the neck portion in the dimension in the width direction,
    the regulating portion includes a gap being greater than the neck portion and smaller than the head portion in the dimension in the width direction, and
    the neck portion passes through the gap and comes into contact with the head portion including the contact site when the first hard resin portion displaces away from the second hard resin portion along the axial direction of the shaft portion such that displacement of the first hard resin portion further away from the second hard resin portion can be regulated.

4. The fixture according to claim 1,
    wherein the shaft portion includes a large-diameter portion,
    the large-diameter portion is a part of the shaft portion, and has an outside diameter greater than outside diameters of portions other than the part, and
    the large-diameter portion is provided at a position closer to the spacer than the first fixing portion of the shaft portion.

5. The fixture according to claim 1,
    wherein a flanged portion is provided on an outer periphery of the connection portion,
    the flanged portion is a plate portion with a plate thickness direction aligned with the axial direction of the shaft portion, and
    the flanged portion is embedded in the spacer.

6. The fixture according to claim 1,
wherein one end of the first hard resin portion reaches the inside of the spacer,
a plate portion is provided at one end of the first hard resin portion,
the plate portion has a plate thickness direction aligned with the axial direction of the shaft portion, and
the plate portion is embedded in the spacer.

7. The fixture according to claim 1,
wherein the soft resin portion includes a covering layer, and
the covering layer partially or entirely covers the outer peripheral side of at least one of the first hard resin portion and the second hard resin portion.

8. The fixture according to claim 1,
wherein at least one of the first fixing portion and the second fixing portion includes a snap portion,
the snap portion is configured to be elastically deformed when the snap portion is inserted into a through-hole and so that the elastically deformed shape is restored after the snap portion has passed through the through-hole, and the snap portion is configured to be fitted into a fitted site on a periphery of the through-hole and to be prevented from being pulled out from the through-hole, and
the snap portion includes a fitting site configured to come into contact with the fitted site when the snap portion is fitted into a site on a periphery of the through-hole, and the fitting site is made of a soft resin having a property of dampening vibration such that vibration transmitted from either the snap portion or the fitted site to the other can be dampened.

\* \* \* \* \*